US008923246B2

(12) United States Patent
Kreuchauf et al.

(10) Patent No.: US 8,923,246 B2
(45) Date of Patent: Dec. 30, 2014

(54) OPTIMIZATION OF DATA HANDOVER TO WIRELESS WIDE AREA NETWORKS

(75) Inventors: Juergen Kreuchauf, San Francisco, CA (US); Jing Zhu, Portland, OR (US)

(73) Assignees: Intel Mobile Communications GmbH, Neubiberg (DE); Intel Corporation, Santa Clara, CA (US)

( * ) Notice: Subject to any disclaimer, the term of this patent is extended or adjusted under 35 U.S.C. 154(b) by 112 days.

(21) Appl. No.: 13/336,024

(22) Filed: Dec. 23, 2011

(65) Prior Publication Data

US 2013/0163450 A1 Jun. 27, 2013

(51) Int. Cl.
*H04W 4/00* (2009.01)
*H04W 36/00* (2009.01)
*H04W 76/04* (2009.01)

(52) U.S. Cl.
CPC ........ *H04W 76/045* (2013.01); *H04W 36/0083* (2013.01)
USPC ........................................................ 370/331

(58) Field of Classification Search
CPC ... H04W 76/02; H04W 76/04; H04W 76/046; H04W 52/02; H04W 36/0083; H04W 76/045
USPC .......... 370/311, 331, 338, 352, 450; 455/436, 455/574; 709/203, 206, 224, 227
See application file for complete search history.

(56) References Cited

U.S. PATENT DOCUMENTS

| 2004/0146027 | A1* | 7/2004 | Shinozaki et al. | 370/335 |
|---|---|---|---|---|
| 2006/0203782 | A1* | 9/2006 | Kwak et al. | 370/335 |
| 2007/0014236 | A1* | 1/2007 | Jang et al. | 370/229 |
| 2008/0039032 | A1 | 2/2008 | Haumont | |
| 2009/0017810 | A1* | 1/2009 | Harsch | 455/418 |
| 2010/0185773 | A1* | 7/2010 | Dunk | 709/227 |
| 2010/0329209 | A1* | 12/2010 | Akselsen | 370/331 |
| 2011/0194436 | A1* | 8/2011 | Song et al. | 370/252 |
| 2011/0194437 | A1* | 8/2011 | Song et al. | 370/252 |
| 2011/0305177 | A1* | 12/2011 | Woo et al. | 370/311 |
| 2012/0026903 | A1* | 2/2012 | Song et al. | 370/252 |
| 2012/0087343 | A1* | 4/2012 | Todd et al. | 370/331 |
| 2012/0257557 | A1* | 10/2012 | Yamazaki et al. | 370/311 |

FOREIGN PATENT DOCUMENTS

WO 2011091433 A2 7/2011

OTHER PUBLICATIONS

Feng Qian et al.; "Characterizing Radio Resource Allocation for 3G Networks"; Proceedings of the 10th annual conference on Internet measurement; Nov. 1-3, 2010; pp. 137-150.
Office action issued in the related DE Application No. 10 2012 112 278.4, mailed on Jun. 26, 2014, 12 pages of office action including 5 pages of English translation.

* cited by examiner

*Primary Examiner* — Ricky Ngo
*Assistant Examiner* — Kabir Jahangir

(57) ABSTRACT

A method, system, and computer program product for managing a radio resource control state of a user equipment. A triggering module may be configured to determine whether a number of triggering conditions are satisfied. Also, responsive to satisfying the number of triggering conditions, a sustain module may be configured to initiate a sustain message. The sustain message may prevent the radio resource control state of the user equipment from changing states.

15 Claims, 8 Drawing Sheets

OPTIMIZATION OF DATA HANDOVER TO WIRELESS WIDE AREA NETWORKS

TECHNICAL FIELD

Aspects of this disclosure relate generally to network handover procedures. In particular, an aspect of this disclosure relates to managing a radio resource control state of user equipment.

BACKGROUND

User equipment (UE), such as a computer, PDA, cellular phone, smartphone, tablet PC, laptop, etc., are increasingly equipped with both a wireless local area network (WLAN), e.g. Wi-Fi, and a wireless wide area network (WWAN) cellular radio, e.g. 3G. One type of 3G radio technology is the Universal Mobile Telecommunications System (UMTS). A multi-radio UE may connect to the Internet over WLAN whenever it is available. The multi-radio UE may also switch to WWAN when performance degradation over WLAN is detected.

Compared to WiFi, 3G systems may operate under more radio resource constraints. To efficiently utilize the limited radio resources, UMTS may introduce for each UE, a radio resource control (RRC) state machine that determines radio resource usage affecting device energy consumption and user experience. Usually a UE can be in one of three states, each with different amount of allocated radio resources. The transitions between states also have significant impact on the UMTS system. Frequent state promotions (resource allocation) may lead to unacceptably long delays for the UE to acquire capability to send and receive data, as well as additional processing overheads for the radio access network and additional UE power consumption. State demotions (resource release) are controlled by inactivity timers affecting radio resource utilization and UE energy consumption.

State promotions may incur long "ramp-up" latency, also referred to as a hand-off latency, of up to 2 seconds during which tens of control messages are exchanged between a UE and the Radio Network Controller (RNC) for resource allocation (e.g., radio bearer setup and RRC connection setup). Excessive state promotions increase the management overhead at the RNC and degrade user experience, especially for short data transfers.

Therefore, it would be advantageous to have a method, system, and computer program product that addresses one or more of the issues discussed above.

SUMMARY

A method for managing a radio resource control state of user equipment. The method may determine whether a number of triggering conditions are satisfied. Then, responsive to satisfying the number of triggering conditions, the method may initiate a sustain message. The sustain message may prevent the radio resource control state of the user equipment from changing states.

A system for managing a radio resource control state of a user equipment. The system comprises a memory unit, a processing unit connected to the memory unit, a sustain module, and a triggering module. The triggering module may be configured to determine whether a number of triggering conditions are satisfied. Also, responsive to satisfying the number of triggering conditions, the sustain module may be configured to initiate a sustain message. The sustain message may prevent the radio resource control state of the user equipment from changing states.

A computer program product comprising logic encoded on a tangible media for managing a radio resource control state of user equipment. The logic may comprise instructions for determining whether a number of triggering conditions are satisfied. Also, responsive to satisfying the number of triggering conditions, the logic may comprise instructions for initiating a sustain message. The sustain message prevents the radio resource control state of the user equipment from changing states.

BRIEF DESCRIPTION OF DRAWINGS

In the drawings, like reference characters generally refer to the same parts throughout the different views. The drawings are not necessarily to scale. In the following description, aspects of this disclosure are described with reference to the following drawings, in which.

DETAILED DESCRIPTION

The following detailed description refers to the accompanying drawings that show, by way of illustration, specific details and aspects of this disclosure. The word "exemplary" is used herein to mean "serving as an example, instance, or illustration". Any aspect of this disclosure or design described herein as "exemplary" is not necessarily to be construed as preferred or advantageous over other aspects of this disclosure or designs.

Figure 1:
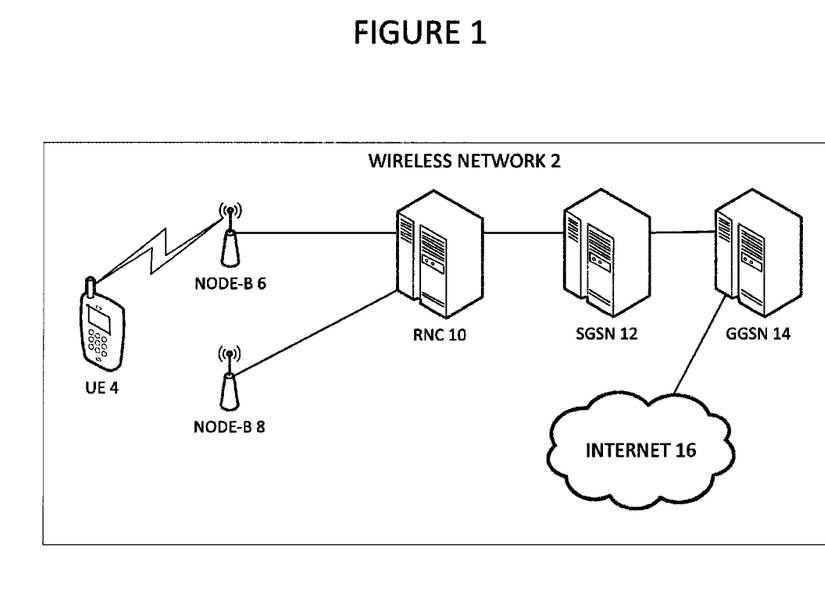
FIG. 1 is an illustration of a wireless network in accordance with an aspect of this disclosure.

FIG. 1 is an illustration of a wireless network in accordance with an aspect of this disclosure. In an aspect of this disclosure, wireless network 2 may be a network implemented with radio signals. In different aspects, various components of wireless network 2 may use wired connections as well as wireless connections. Wireless network 2 may be a wireless wide area network (WWAN). The WWAN may use mobile telecommunication cellular network technologies such as Long Term Evolution (LTE), LTE-Advanced, WiMAX (often called a wireless metropolitan area network or WMAN), UMTS, CDMA2000, GSM, cellular digital packet data (CDPD) and Mobitex to transfer data.

In an aspect of this disclosure, wireless network 2 may include user equipment (UE) 4, Node-B 4, Node-B 8, Radio Network Controller (RNC) 10, Serving General Packet Radio Service Support Node (SGSN) 12, Gateway General Packet Radio Service Support Node (GGSN) 14, and Internet 16. UE 4 transmits and receives information through Node-Bs 6 and 8. In turn, Node-B's forward information to and from RNC

10. RNC 10 communicates with SGSN 12 which communicates with GGSN 14. Finally, GGSN 14 is communicates between SGSN 12 and Internet 16.

Furthermore, in an aspect of this disclosure, Node-B's 6 and 8 and RNC 10 may be part of UMTS Terrestrial Radio Access Network (UTRAN). Additionally, SGSN 12 and GGSN 14 may be part of the Core Network (CN).

In an aspect of this disclosure, UE 4 may be a mobile handsets carried by end users. The UTRAN allows connectivity between a UE and the CN. The CN may consist of two components: base stations, called Node-Bs, and Radio Network Controllers (RNC), which control multiple Node-Bs. UTRAN features such as packet scheduling, radio resource control, and handover control may be implemented at RNC 10. The CN operates, in particular GGSN 14, to serve as a gateway hiding UMTS internal infrastructures from the external network, such as Internet 16.

In an aspect of this disclosure, Node-Bs 6 and 8 may be, as used in UMTS, equivalent to the base transceiver station (BTS) description used in the Global System for Mobile Communications (GSM). In contrast with GSM base stations, Node-Bs 6 and 8 may use Wideband Code Division Multiple Access or Time Division Synchronous Code Division Multiple Access (WCDMA/TD-SCDMA) as an air interface technology. As in all cellular systems, such as UMTS and GSM, the Node-Bs 6 and 8 have radio frequency transmitters and receivers used to communicate directly with mobile devices.

In an aspect of this disclosure, RNC 10 is a governing element in a UMTS radio access network and is responsible for controlling Node Bs 6 and 8 that are connected to it. RNC 10 carries out radio resource management, some of the mobility management functions, and is the point where encryption is done before user data is sent to and from the mobile.

The illustration of wireless network 2 in FIG. 1 is not meant to imply physical or architectural limitations to the manner in which an aspect of this disclosure may be implemented. Other components in addition and/or in place of the ones illustrated may be used. Some components may be unnecessary in an aspect of this disclosure.

Figure 2:
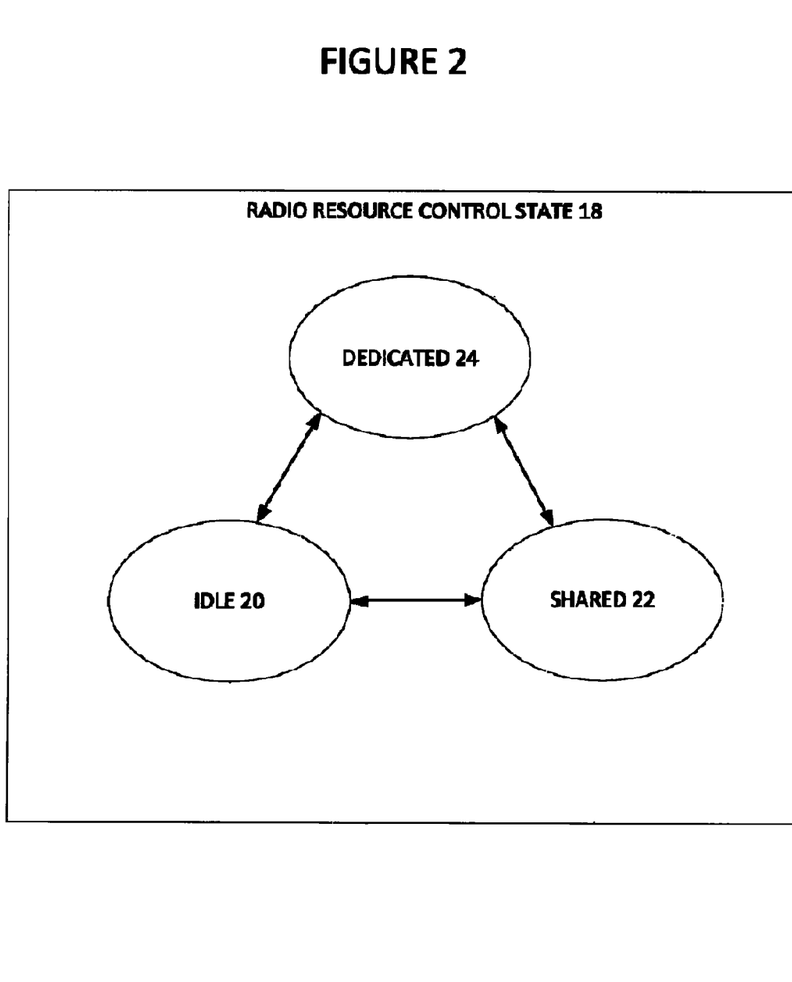
FIG. 2 is a block diagram of a radio resource control (RRC) state in accordance with an aspect of this disclosure.

FIG. 2 is a block diagram of a radio resource control (RRC) state in accordance with an aspect of this disclosure. RRC state 18 may be a state defining a relationship between UE 4 and a RNC 10. RRC state 18 may identify the resource allocation currently applied to UE 4.

In an aspect of this disclosure, the Radio Resource Control (RRC) protocol includes: functions for connection establishment and release, broadcast of system information, radio bearer establishment/reconfiguration and release, RRC connection mobility procedures, paging notification and release, and outer loop power control.

In the context of UMTS, the radio resource refers to WCDMA codes that are potential bottleneck resources of the network. The UMTS radio resource control protocol introduces a state machine associated with each UE 4. In an aspect of this disclosure, there may be three RRC states, idle 20, shared 22, and dedicated 24.

In an aspect of this disclosure, during idle 20, UE 4 has not yet established an RRC connection with RNC 10, and no data transmission is possible in this state. During dedicated 24, the RRC connection is established and UE 4 may be allocated dedicated transport channels in both downlink and uplink direction. Dedicated 24 may allow UE 4 to fully utilize radio resource for data transmission. During shared 22, the RRC connection is established without dedicated transport channels. Shared 22 may allow UE 4 to transmit user data through shared low-speed channels at very low rate.

The aspects of this disclosure recognize and take into account that when the multi-radio UE is connected to WLAN for Internet access, the 3G radio will stay in "idle 22" since no traffic is delivered over the 3G connection. It may take about 1 to 2 seconds for the radio to transit from "idle 20" to "dedicated 24", which may increase hand-off latency and decrease user experience of a delay-sensitive application, such as voice over Internet Protocol service call (any services which rely on quality of service)

In an aspect of this disclosure, idle 20, also referred to as IDLE, may be the default state when UE 4 is turned on. UE 4 has not yet established an RRC connection with RNC 10, thus no radio resource is allocated. Additionally, UE 4 may not transfer any user data.

In an aspect of this disclosure, dedicated 24, which may also be referred to as CELL-DCH, is a dedicated state. The RRC connection is established and UE 4 may be allocated dedicated transport channels in both the downlink (from RNC 10 to UE 4) and the uplink (UE 4 to RNC 10) direction. Dedicated 24 may allow UE 4 to fully utilize radio resources for user data transmission.

The aspects of this disclosure recognize and take into account that UE 4 may access a mode, such as, High Speed Downlink/Uplink Packet Access (HSDPA/HSUPA) mode, during dedicated 24. In the example of HSDPA, a high speed transport channel may not be dedicated, but shared by a limited number (e.g., 32) of users. Further, when a large number of UEs are in dedicated 24, the radio resources may be exhausted due to the lack of channelization codes in the cell. In this example, some UEs may have to use low-speed shared channels although their RRC states are still dedicated 24.

In an aspect of this disclosure, shared 22, also referred to as CELL-FACH, utilizes a shared channel. The RRC connection is established but there is no dedicated channel allocated to UE 4. Instead, UE 4 can only transmit user data through shared low-speed channels. In an aspect of tis disclosure, these channels may be less than 15 kbps. The aspects of this disclosure recognize and take into account that shared 22 of radio resource control state 18 may be designed for applications requiring very low data throughput rate. Furthermore, shared 22 may consume less radio resources than dedicated 24.

The aspects of this disclosure recognize and take into account that RRC state 18 impact energy consumption of UE 4. UE 4 at idle 20 may consume almost no energy from its radio interface. The radio power consumption for dedicated 24 may be 50% to 100% higher than that for shared 22.

In an aspect of this disclosure, the RRC state machine may be maintained at both UE 4 and RNC 10. UE 4 and RNC 10 may always be synchronized via control channels except during transient and error situations. Also note that both the downlink (DL) and the uplink (UL) may use the same state machine.

In an aspect of this disclosure, in the RRC state machine, there are two types of state transitions. A first type of state transition, state promotions, includes idle 20 to shared 22, idle 20 to dedicated 24, and shared 22 to dedicated 24. State promotions may switch from a state with lower radio resource and UE 4 energy utilization to another state consuming more resources and UE 4 energy. A second type of state transition, state demotions, includes dedicated 24 to shared 22, shared 22 to idle 20, and dedicated 24 to idle 20. Depending on the starting state, a state promotion may be triggered by either any user data transmission activity, e.g. when UE 4 is at idle 20, or the per-UE queue size, called Radio Link Controller (RLC) buffer size, exceeding a threshold in either direction, if UE 4 is at shared 22.

In an aspect of this disclosure, RRC state 18 demotions may be triggered by two inactivity timers maintained by RNC 10. During dedicated 24, RNC 10 may reset the timer to T seconds, a fixed threshold, whenever RNC 10 observes any UL/DL data frame. If there is no user data transmission activity for T seconds, the timer times out and RRC state 18 may be demoted to shared 22. In another aspect of this disclosure, RRC state 18 may be demoted from dedicated 24 to idle 20. Furthermore, when RRC state 18 is at shared 22 and the timer times out, RRC state 18 may be demoted from shared 22 to idle 20.

The aspects of this disclosure take into account and recognize that state promotions may incur a long "ramp-up" latency of up to 2 seconds during which tens of control messages are exchanged between UE 4 and RNC 10 for resource allocation (e.g., radio bearer reconfiguration and RRC connection setup). Excessive state promotions increase the management overhead at RNC 10 and degrade user experience, especially for short data transfers.

The illustration of radio resource control state 18 in FIG. 2 is not meant to imply physical or architectural limitations to the manner in which an aspect of this disclosure may be implemented. Other components in addition and/or in place of the ones illustrated may be used. Some components may be unnecessary in an aspect of this disclosure An aspect of this disclosure provides a method of efficiently sending out "keep-alive" messages over 3G to keep the 3G radio in the "CELL_DCH" before the hand-off (WLAN to WWAN) is triggered. This method may eliminate the 1 to 2 second "CELL_IDLE" to "CELL_DCH" transition time since UE 4 may stay in "CELL_DCH" and may not enter "IDLE". An aspect of this disclosure provides a method to send out periodic keep-alive message over 3G while WLAN is still connected for Internet access, a method to measure the network-determined inactive timer that is used by RNC to trigger transition out of "CELL_DCH", a method to determine the minimum keep-alive message size to keep 3G modem in "CELL_DCH", and a set of triggers to avoid unnecessary "keep-alive" messages and minimize the impact on device power consumption.

Figure 3:
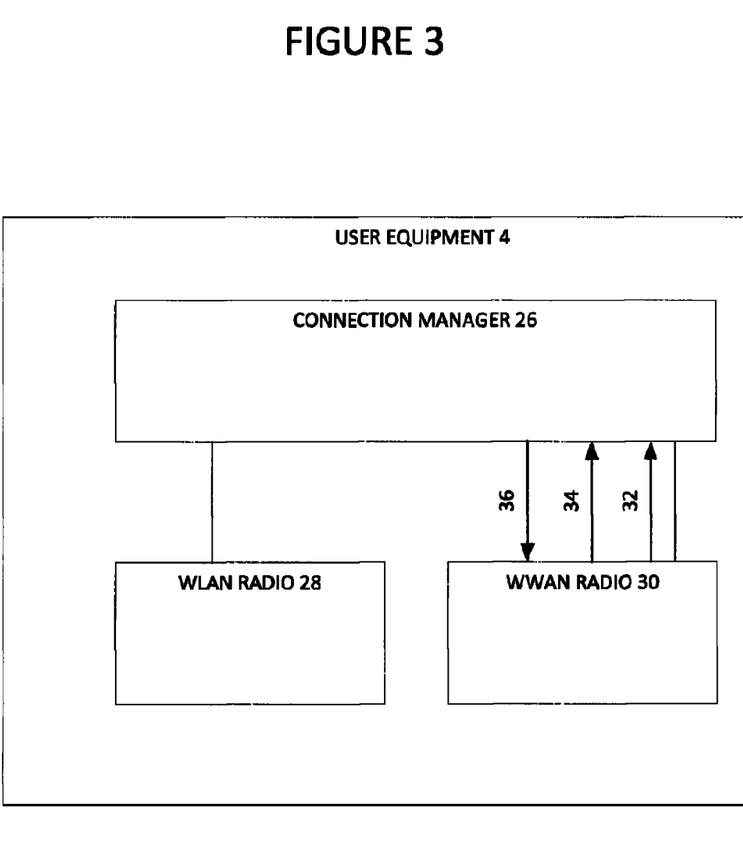
FIG. 3 is a block diagram of user equipment in accordance with an aspect of this disclosure.

FIG. 3 is a block diagram of user equipment in accordance with an aspect of this disclosure. User equipment 4 may include connection manager 26, WLAN radio 28, and WWAN radio 30.

In an aspect of this disclosure, communication 32 may be the last inactive timer measurement. Communication 34 may be the CELL_DCH indicator identifying whether dedicated 24 is active. Communication 36 may be the keep-alive message, e.g. a user datagram protocol (UDP) dummy packet. The keep-alive message may also be referred to as a sustain message.

In an aspect of this disclosure, communications 32 and 34 are either periodic or event driven (when change is detected). The keep-alive message may be periodic.

In an aspect of this disclosure, the keep-alive message time period may be shorter than the inactive timer measurement period to keep the 3G radio in "CELL_DCH". For example, the keep-alive message time period may be equal to 95% of the inactive timer measurement period. In other aspects of this disclosure, other percentages may be used, such as, for example, 99%, 90%, or any other suitable percentage. In another aspect of this disclosure, the keep-alive message time period may be equal to the inactive timer measurement period minus a constant, for example, 100 ms, 200 ms, 500 ms, or any other suitable constant.

Figure 4:
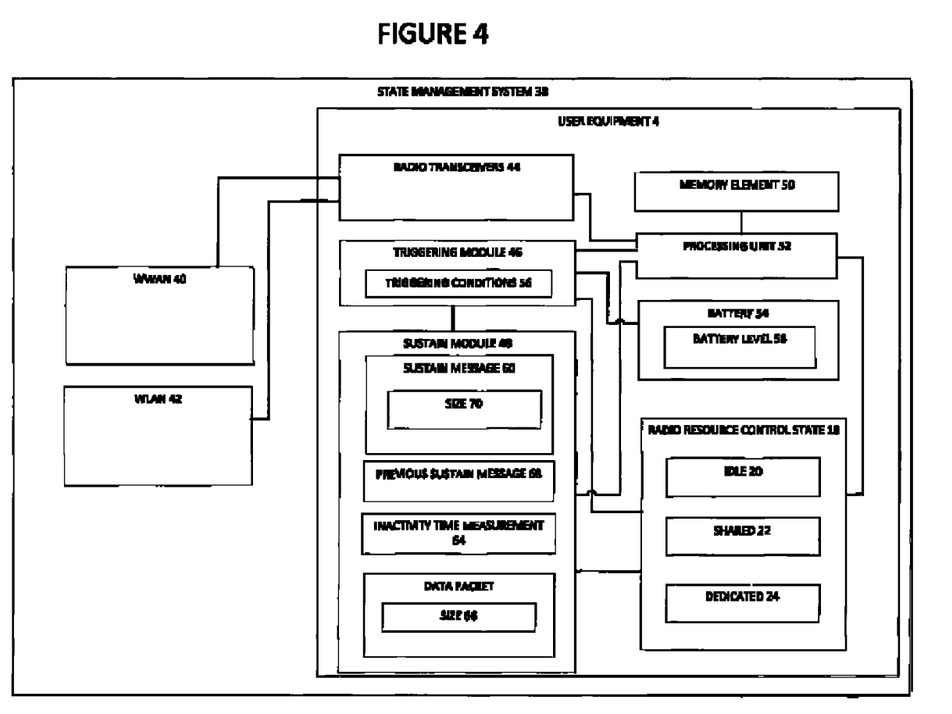
FIG. 4 is a block diagram of a state management system in accordance with an aspect of this disclosure.

The illustration of user equipment 4 in FIG. 3 is not meant to imply physical or architectural limitations to the manner in which an aspect of this disclosure may be implemented. Other components in addition and/or in place of the ones illustrated may be used. Some components may be unnecessary in an aspect of this disclosure FIG. 4 is a block diagram of a state management system in accordance with an aspect of this disclosure. State management system 38 may be configured to manage radio resource control state 18 of user equipment 4. State management system 38 may include user equipment 4, WWAN 40, and WLAN 42.

In an aspect of this disclosure, user equipment 4 may be connected to WWAN 40 and WLAN 42 using radio transceivers 44. Radio transceivers 44 may include WWAN radio 28 and WLAN radio 30 as shown in FIG. 3. User equipment 4 may also include triggering module 46, sustain module 48, radio resource control state 18, memory element 50, processing unit 52, and battery 54. User equipment 4 may also include other components not shown in this FIGURE, such as, for example, an antenna, a bus, and other modules and components.

In an aspect of this disclosure, radio resource control state 18 may include states of idle 20, shared 22, and dedicated 24. Radio resource control state 18 may communicate with processing unit 52, triggering module 46, and sustain module 48.

In an aspect of this disclosure, triggering module 46 may be configured to determine whether a number of triggering conditions 56 are satisfied. Triggering conditions 56 may include, but not limited to, data that is being transmitted over WLAN 42 is delay sensitive, user equipment 4 is connected to and using WLAN 42, signal strength variation of WLAN 42 over a period of time is greater than a threshold, WWAN received signal strength is greater than a threshold, battery level 58 of user equipment 4 is above a threshold, and/or a hand-off from the currently connected WLAN 42 to WWAN 40 occurring within a number of days less than a threshold. Triggering conditions 46 may include any combination of the above example triggering conditions. Additionally, in an aspect of this disclosure, triggering conditions 46 may include other suitable triggering conditions.

In an aspect of this disclosure, sustain module 48 may be configured to initiating sustain message 60. Sustain module 48 may initiate sustain message 60 in response to satisfying triggering conditions 56. Sustain message 60 may prevent radio resource control state 18 of user equipment 4 from transitioning or changing states. For example, sustain message 60 may prevent radio resource control state 18 from having a state demotion or state promotion.

In an aspect of this disclosure, initiating sustain message 60 comprises sending sustain message 60 over WWAN 40 at a time from previous sustain message 68 that is less than the time period of inactivity time measurement 64 from previous sustain message 68. In another aspect of this disclosure, initiating sustain message 60 comprises sending sustain message 60 over a WWAN 40, wherein a size of sustain message 60 is size 66 of data packet 62.

In an aspect of this disclosure, sustain module 48 may be configured to measure a time period between a change/transition in radio resource control state 18 and data packet 62 most recently transmitted or received before the change/transition in radio resource control state 18 to form inactivity time measurement 64. In an aspect of this disclosure, sustain module 48 may also be configured to identify size 66 of data packet 62 that is large enough to keep radio resource control state 18 in dedicated 24.

In an aspect of this disclosure, sustain message 60 may include size 70. Size 70 may be a size of sustain message 70 necessary to prevent a state transition to radio resource control state 18. In other words, if size 70 is too small, sustain message 60 may not keep radio resource control state 18 from transitioning.

Additionally, user equipment 4 may include one or more memory elements (e.g., memory element 50) for storing information to be used in achieving operations associated with applications management, as outlined herein. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Any of the memory or storage items discussed herein should be construed as being encompassed within the broad term 'memory element' as used herein.

Furthermore, the operations for managing radio resource control state 18 of user equipment 4 herein may be implemented by logic encoded in one or more tangible media, which may be inclusive of non-transitory media (e.g., embedded logic provided in an application specific integrated circuit (ASIC), digital signal processor (DSP) instructions, software potentially inclusive of object code and source code to be executed by a processor or other similar machine, etc.). In some of these instances, one or more memory elements (e.g., memory element 50) can store data used for the operations described herein. This includes the memory elements being able to store software, logic, code, or processor instructions that are executed to carry out the activities described herein.

Additionally, user equipment 4 may include processing unit 52. Processing unit 52 may be a processor, multi-core processor, single core process, micro controller, controller circuit, or any other type of processing device. A processing unit can execute any type of instructions associated with the data to achieve the operations detailed herein. In one aspect of this disclosure, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

The illustration of state management system in FIG. 4 is not meant to imply physical or architectural limitations to the manner in which an aspect of this disclosure may be implemented. Other components in addition and/or in place of the ones illustrated may be used. Some components may be unnecessary in an aspect of this disclosure. Also, the blocks are presented to illustrate some functional components. One or more of these blocks may be combined and/or divided into different blocks when implemented in an aspect of this disclosure. For example, in an aspect of this disclosure, sustain module 48 and triggering module 46 may be combined as part of processing unit 52.

The foregoing has outlined rather broadly the features and technical advantages of the different aspects of this disclosure in order for the detailed description that follows may be better understood. Additional features and advantages of the aspects of this disclosure will be described hereinafter. It should be appreciated by those skilled in the art that the conception and the specific aspects disclosed may be readily utilized as a basis for modifying or redesigning other structures or processes for carrying out the same purposes of the different aspects of this disclosure. It should also be realized by those skilled in the art that such equivalent constructions do not depart form the spirit and scope as set forth in the appended claims.

Figure 5A:
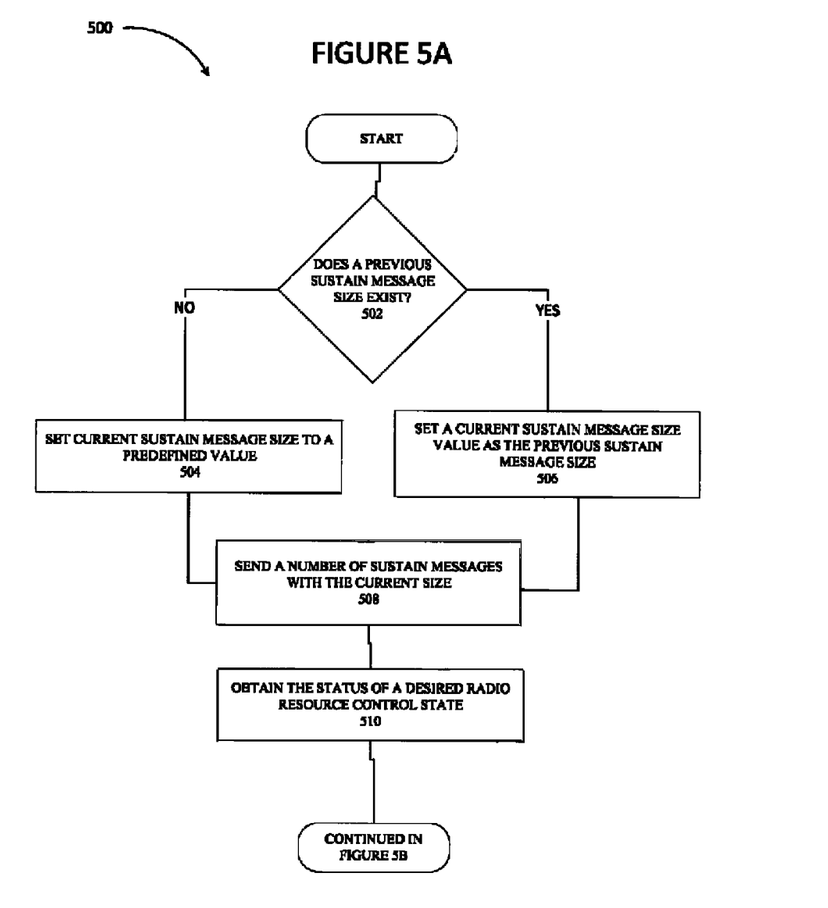
FIG. 5 is a flowchart for managing a radio resource control state of a user equipment in accordance with an aspect of this disclosure.
Figure 5B:
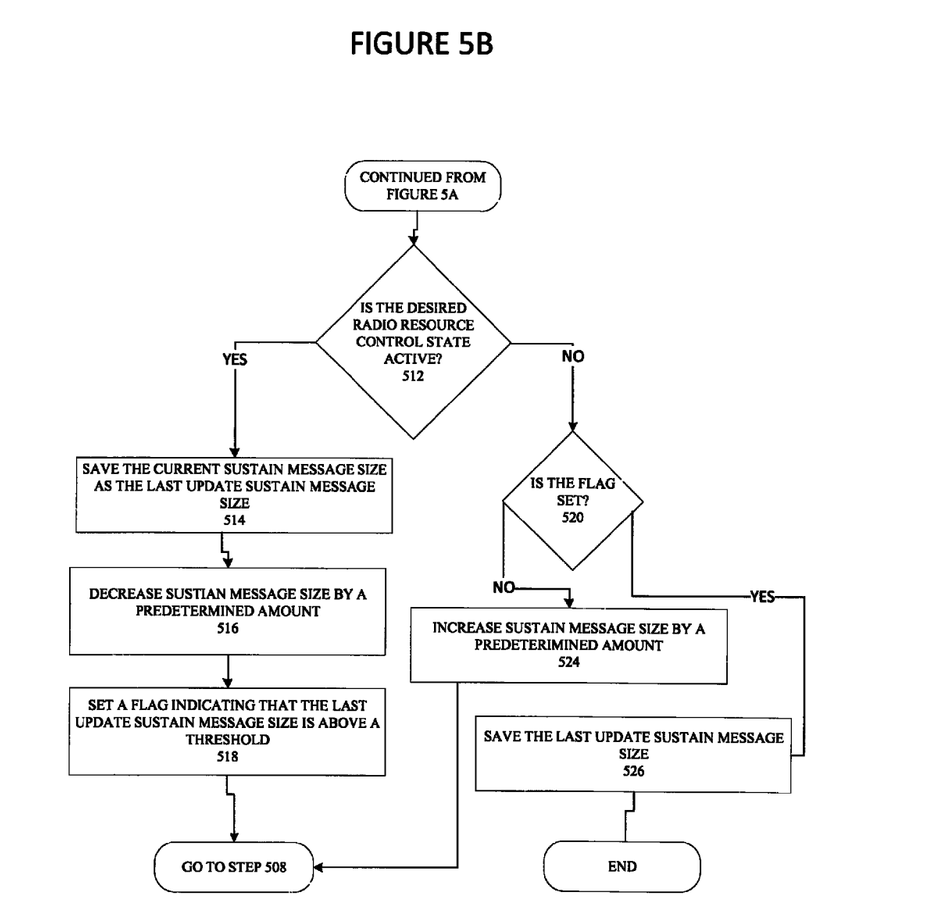

FIG. 5 is a flowchart for managing a radio resource control state of a user equipment in accordance with an aspect of this disclosure. Process 500 may be implemented in state management system 38 from FIG. 4.

In an aspect of this disclosure, process 500 begins with a sustain module identifying whether a previous sustain message size exists (step 502). The previous sustain message size may be from a message size recently used or a message size from a previous entire process that has occurred. If the previous sustain message size does not exist, the sustain module may set a current sustain message size value to a predefined value (step 504). If the previous sustain message size exists, the sustain module may set a current sustain message size value as the previous sustain message size (step 506).

Next, the user equipment sends a number of sustain messages with the current sustain message size (step 508). The term "a number of" as used herein may be one or more. Then, the user equipment obtains a status of a desired radio resource control state (step 510). The status may be one of IDLE, DCH, or FACH. These may also be referred to as idle, dedicated, and shared.

Then, the user equipment determines whether the desired radio resource control state is active (step 512). If the desired radio resource control state is active, the sustain module may save the current sustain message size as the last update sustain message size (step 514). Then, the sustain module may decrease the sustain message size by a predetermined amount (step 516). The predetermined amount may be selected by a user, programmed into the logic of the hardware or software, and/or set dynamically. Next, the sustain module may set a flag indicating that the last update sustain message size is above a threshold (step 518). The threshold may be the size sufficient to keep the UE in the desired radio resource control state. Then, the method proceeds back to step 508.

In step 512, if the desired radio resource control state is not active, the sustain module may identify whether a flag is set (step 520). The flag may be set with a setting of a bit. If the flag is not set, the sustain module may increase the sustain message size by a predetermined amount (step 524). The predetermined amount may be selected by a user, programmed into the logic of the hardware or software, and/or set dynamically. Then, the method proceeds to step 508.

Figure 7:
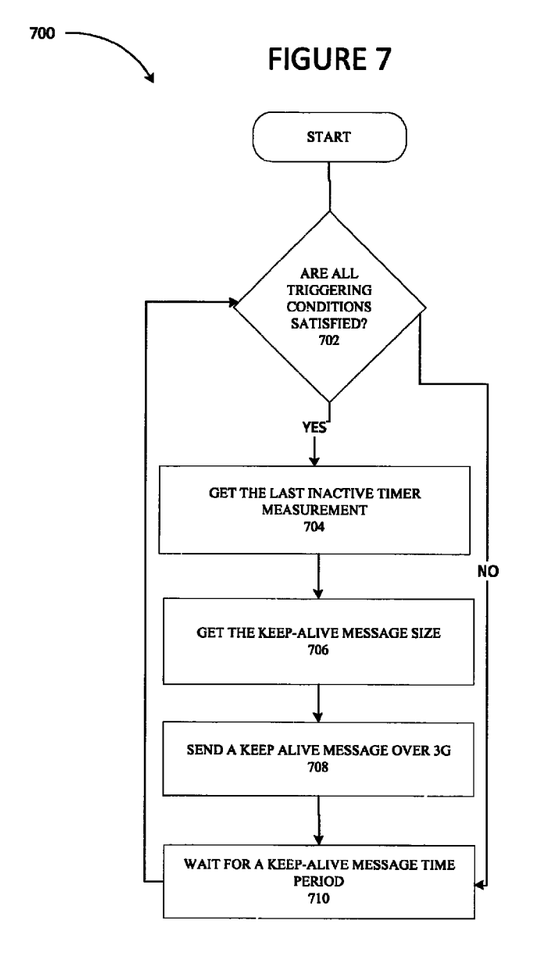
FIG. 7 is a flowchart for managing a radio resource control state of user equipment in accordance with an aspect of this disclosure.

In step 520, if the flag is set, the sustain module may save the last update sustain message size (step 526). In an aspect of this disclosure, the last update sustain message size may be used as the keep-alive message size in step 706 of the process 700. Thereafter, the process terminates.

Figure 6:
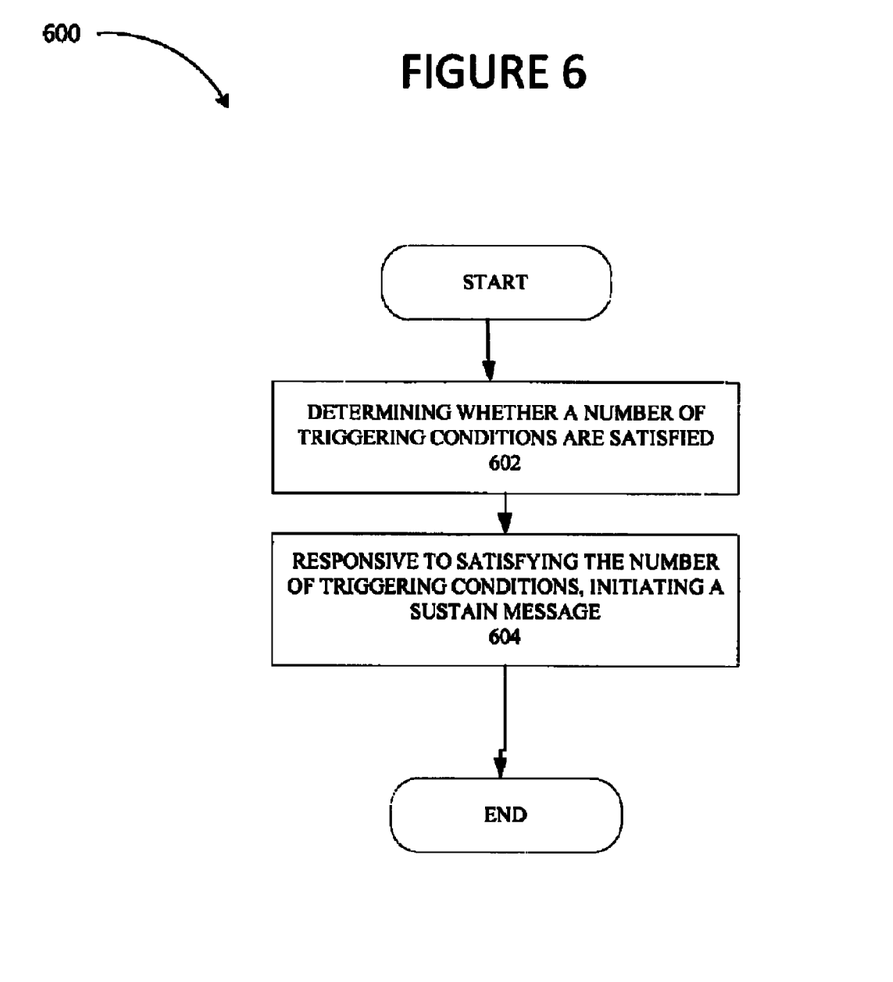
FIG. 6 is a flowchart for managing a radio resource control state of user equipment in accordance with an aspect of this disclosure.

FIG. 6 is a flowchart for managing a radio resource control state of user equipment in accordance with an aspect of this disclosure. Process 600 may be implemented in state management system 38 from FIG. 4.

Process 600 begins with a triggering module determining whether a number of triggering conditions are satisfied (step 602). Next, responsive to satisfying the number of triggering conditions, a sustain module initiates a sustain message (604). Thereafter, the process terminates.

FIG. 7 is a flowchart for managing a radio resource control state of user equipment in accordance with an aspect of this disclosure. Process 700 may be implemented in state user equipment 4 from FIG. 3.

Process 700 begins determining whether all triggering conditions are satisfied (step 702). The triggering conditions may include, whether WLAN is connected and used for Internet access, whether WLAN signal strength variation in last "x" (e.g. 3) seconds is above "r" (e.g. 5) dB, whether a UE battery level is above "c" (e.g. 30%), whether a WLAN to 3G handoff has been triggered at least once in this 3G cell in last "n1" (e.g. 30) days, and/or whether data traffic that is being delivered over WLAN is delay sensitive (e.g. a voice over IP call). In the above listed triggering conditions, the parameters: x, r, c, and n1 may be configurable. The triggering conditions may indicate periods of activity for the UE that it may be desirable to decrease a hand-off time period from IDLE to DCH.

If not all the triggering conditions are satisfied, the process waits for a keep-alive message time period (step 710). The keep-alive message time period may be set as a percentage of the inactivity time period. The inactivity time period is the period of time that the UE may transition from a DCH state to an IDLE or FACH state. If all the triggering conditions are satisfied, the process obtains the last inactive timer measurement (step 704). In different aspects of this disclosure, there may be any number of triggering conditions and any combination of triggering conditions. In some aspects of this disclosure, there may be no triggering conditions. Then, the process obtains the keep-alive (sustain message) size (step 706). Next, the process sends a keep-alive message over a 3G network (WWAN) (step 708). Finally, the process waits for the keep-alive message time period (step 710) before proceeding back to step 702 and repeating process 700.

The flowcharts and block diagrams in the different depicted aspects illustrate the architecture, functionality, and operation of some possible implementations of apparatus, methods, system, and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

In an aspect of this disclosure, there is a method for managing a radio resource control state of a user equipment, the method comprising: determining whether a number of triggering conditions are satisfied; and responsive to satisfying the number of triggering conditions, initiating a sustain message, wherein the sustain message prevents the radio resource control state of the user equipment from changing states.

In an example of any aspects of this disclosure, the method further comprises measuring a time period between a change in the radio resource control state and a data packet most recently transmitted or received before the change in the radio resource control state to form an inactivity time measurement.

In an example of any aspects of this disclosure, the method further comprises identifying a size of a data packet that is large enough to keep the radio resource control state in a dedicated control channel state.

In an example of any aspects of this disclosure, initiating the sustain message comprises: sending the sustain message over a wireless wide area network at a time from a previous sustain message that is less than the time period of the inactivity time measurement from the previous sustain message.

In an example of any aspects of this disclosure, initiating the sustain message comprises: sending the sustain message over a wireless wide area network, wherein a size of the sustain message is the size of the data packet.

In an example of any aspects of this disclosure, the number of triggering conditions comprises data that is being transmitted over a wireless local area network to be delay sensitive.

In an example of any aspects of this disclosure, the number of triggering conditions comprises the user equipment being connected to and using a wireless local area network.

In an example of any aspects of this disclosure, the number of triggering conditions comprises a signal strength variation of a wireless local area network over a period of time being greater than a threshold.

In an example of any aspect of this disclosure, the number of triggering conditions comprises identifying whether data traffic is still flowing through the wireless connection.

In an example of any aspects of this disclosure, the number of triggering conditions comprises a battery level of the user equipment being above a threshold. For example, if the battery level is below a threshold, the number of triggering conditions may not be satisfied. In this example, a UE may not send any sustain messages when the battery level is below a threshold.

In an example of any aspects of this disclosure, the number of triggering conditions comprises a handover from the currently connected wireless local area network to a wireless wide area network occurring within a number of days less than a threshold. For example, a handover from a WLAN to a WWAN has not occurred within a threshold number of days, the number of triggering conditions may not be satisfied.

In another aspect of this disclosure, there is a system for managing a radio resource control state of a user equipment, the system comprising: a memory unit; processing unit connected to the memory unit; and a triggering module configured to determine whether a number of triggering conditions are satisfied; and a sustain module configured to, responsive to satisfying the number of triggering conditions, initiate a sustain message, wherein the sustain message prevents the radio resource control state of the user equipment from changing states.

In an example of any aspects of this disclosure, the system further comprises the sustain module being configured to measure a time period between a change in the radio resource control state and a data packet most recently transmitted or received before the change in the radio resource control state to form an inactivity time measurement.

In an example of any aspects of this disclosure, the system further comprises the sustain module being configured to identify a size of a data packet that is large enough to keep the radio resource control state in a dedicated control channel state.

In an example of any aspects of this disclosure, the sustain module initiating the sustain message comprises the sustain module being configured to:

sending the sustain message over a wireless wide area network at a time from a previous sustain message that is less than the time period of the inactivity time measurement from the previous sustain message.

In an example of any aspects of this disclosure, the sustain module initiating the sustain message comprises the sustain module being configured to: sending the sustain message over a wireless wide area network, wherein a size of the sustain message is the size of the data packet.

In another aspect of this disclosure, there is a computer program product comprising logic encoded on a tangible media for managing a radio resource control state of a user equipment, the logic comprising instructions for: determining whether a number of triggering conditions are satisfied; and responsive to satisfying the number of triggering conditions, initiating a sustain message, wherein the sustain message prevents the radio resource control state of the user equipment from changing states.

In an example of any aspects of this disclosure, the logic further comprises instructions for: measuring a time period between a change in the radio resource control state and a data packet most recently transmitted or received before the change in the radio resource control state to form an inactivity time measurement.

In an example of any aspects of this disclosure, the logic further comprises instructions for: identifying a size of a data packet that is large enough to keep the radio resource control state in a dedicated control channel state.

In an example of any aspects of this disclosure, the instructions for initiating the sustain message comprises instruction for: sending the sustain message over a wireless wide area network at a time from a previous sustain message that is less than the time period of the inactivity time measurement from the previous sustain message.

In an example of any aspects of this disclosure, the instructions for initiating the sustain message comprises instructions for: sending the sustain message over a wireless wide area network, wherein a size of the sustain message is the size of the data packet.

What is claimed is:

1. A method for managing a radio resource control state of a user equipment comprising a wireless wide area network (WWAN) radio and a wireless local area network (WLAN) radio, the method comprising:
   determining when i) the user equipment via the WWAN radio has an established connection with a wireless wide area network in a dedicated control channel state, the dedicated control channel state comprising at least one dedicated uplink and at least one dedicated downlink channel allocated for communication between the user equipment and the wireless wide area network, and when ii) the user equipment has an established connection with a wireless local area network via the WLAN radio, whether a number of triggering conditions associated with the connection between the user equipment and the wireless local area network are satisfied;
   determining a size of a data packet that is sufficient to keep the radio resource control state in a dedicated control channel state; and
   responsive to satisfying the number of triggering conditions, initiating a sustain message,
   wherein initiating the sustain message comprises sending the sustain message over the wireless wide area network via the WWAN radio,
   wherein a size of the sustain message is the size of the data packet, and
   wherein sending the sustain message over the wireless wide area network prevents a Radio Network Controller (RNC) of the wireless wide area network from transitioning the connection between the user equipment and the wireless wide area network from the dedicated control channel state to a connection state without any dedicated communication channels allocated for communication between the user equipment and the wireless wide area network.

2. The method of claim 1, further comprising: measuring a time period between a change in the radio resource control state and a data packet most recently transmitted or received before the change in the radio resource control state to form an inactivity time measurement.

3. The method of claim 2, wherein initiating the sustain message comprises: sending the sustain message over the wireless wide area network at a time from a previous sustain message that is less than the time period of the inactivity time measurement from the previous sustain message.

4. The method of claim 1, wherein the number of triggering conditions comprises data that is being transmitted over a wireless local area network to be delay sensitive.

5. The method of claim 1, wherein the number of triggering conditions comprises the user equipment being connected to and using a wireless local area network.

6. The method of claim 1, wherein the number of triggering conditions comprises a signal strength variation of a wireless local area network over a period of time being greater than a threshold.

7. The method of claim 1, wherein the number of triggering conditions comprises a battery level of the user equipment being above a threshold.

8. The method of claim 1, wherein the number of triggering conditions comprises a handover from a wireless local area network to a wireless wide area network occurring within a number of days less than a threshold.

9. A user equipment configured to manage a radio resource control state of a user equipment, the user equipment comprising:
   a wireless wide area network (WWAN);
   a wireless local area network (WLAN) radio;
   a memory unit;
   a processing unit connected to the memory unit;
   a triggering module configured to determine, when i) the user equipment has via the WWAN radio an established connection with a wireless wide area network in a dedicated control channel state, the dedicated control channel state comprising at least one dedicated uplink and at least one dedicated downlink channel allocated for communication between the user equipment and the wireless wide area network, and when ii) the user equipment has an established connection with a wireless local area network via the WLAN radio, whether a number of triggering conditions associated with the connection between the user equipment and the wireless local area network are satisfied; and
   a sustain module configured to:
      identify a size of a data packet that is sufficient to keep the radio resource control state in a dedicated control channel state, and
      initiate a sustain message in response to satisfying the number of triggering conditions by sending the sustain message over the wireless wide area network via the WWAN radio, wherein the sustain message prevents a Radio Network Controller (RNC) of the wireless wide area network from transitioning the connection between the user equipment and the wireless wide area network from the dedicated control channel state to a connection state without any dedicated communication channels allocated for communication between the user equipment and the wireless wide area network.

10. The user equipment of claim 9, further comprising: measuring a time period between a change in the radio resource control state and a data packet most recently transmitted or received before the change in the radio resource control state to form an inactivity time measurement.

11. The user equipment of claim 10, wherein the sustain module initiating the sustain message comprises the sustain module being configured to: sending the sustain message over a wireless wide area network at a time from a previous sustain message that is less than the time period of the inactivity time measurement from the previous sustain message.

12. The user equipment of claim 10, wherein the sustain module initiating the sustain message comprises the sustain module being configured to: sending the sustain message over a wireless wide area network, wherein a size of the sustain message is the size of the data packet.

13. A computer program product comprising logic encoded on a non-transitory tangible media for managing a radio resource control state of a user equipment comprising a wireless wide area network (WWAN) radio and a wireless local area network (WLAN) radio, the logic comprising instructions for:

determining when i) the user equipment has an established connection in a dedicated control channel state with a wireless wide area network via the WWAN radio, the established connection in the dedicated control channel state comprising at least one dedicated uplink and at least one dedicated downlink channel allocated for communication between the user equipment and the wireless wide area network, and when ii) the user equipment has an established connection with a wireless local area network via the WLAN radio, whether a number of triggering conditions associated with the connection between the user equipment and the wireless local area network are satisfied;

identifying a size of a data packet that is sufficient to keep the radio resource control state in a dedicated control channel state; and responsive to satisfying the number of triggering conditions, initiating a sustain message, wherein the instructions for initiating the sustain message comprises instructions for: sending the sustain message over the wireless wide area network via the WWAN radio, wherein a size of the sustain message is the size of the data packet, wherein the sustain message prevents a Radio Network Controller (RNC) of the wireless wide area network from transitioning the connection between the user equipment and the wireless wide area network from the dedicated control channel state to a connection state without any dedicated communication channels allocated for communication between the user equipment and the wireless wide area network.

14. The computer program product of claim 13, the logic further comprising instructions for: measuring a time period between a change in the radio resource control state and a data packet most recently transmitted or received before the change in the radio resource control state to form an inactivity time measurement.

15. The computer program product of claim 14, wherein the instructions for initiating the sustain message comprises instruction for: sending the sustain message over a wireless wide area network at a time from a previous sustain message that is less than the time period of the inactivity time measurement from the previous sustain message.

* * * * *